V. LINES.
INSECT CATCHER.
APPLICATION FILED JUNE 22, 1912.
1,043,240.
Patented Nov. 5, 1912.
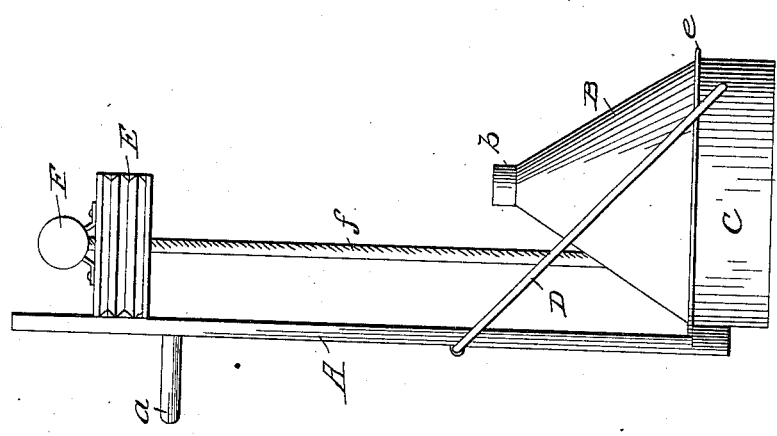
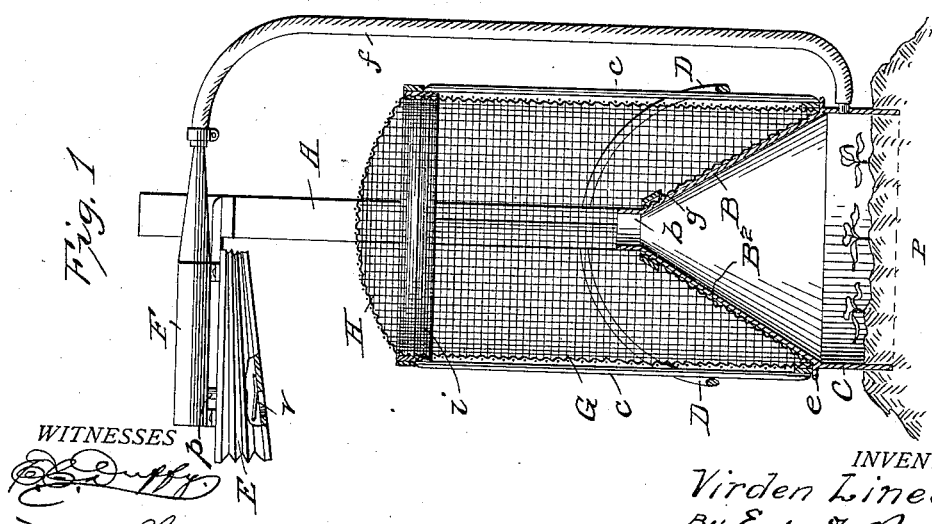
WITNESSES
INVENTOR
Virden Lines.
By Edw. W. Byrn,
Attorney

UNITED STATES PATENT OFFICE.

VIRDEN LINES, OF LA FONTAINE, INDIANA.

INSECT-CATCHER.

1,043,240.

Specification of Letters Patent.

Patented Nov. 5, 1912.

Application filed June 22, 1912. Serial No. 705,198.

*To all whom it may concern:*

Be it known that I, VIRDEN LINES, a citizen of the United States, residing at La Fontaine, in the county of Wabash and State of Indiana, have invented certain new and useful Improvements in Insect-Catchers, of which the following is a specification.

My invention is in the nature of a device which both catches and destroys the insects which infest growing plants, so that not only are the plants saved from destruction, but the insects themselves are destroyed, so that further breeding of these pests is prevented.

My invention is specially designed for such small, low growing, plants as cucumbers, cantaloups and musk-melons, but may be employed for other plants as well, by varying the proportions of the device.

It consists in the novel construction and arrangement of the various parts of the device, as will be hereinafter more fully described with reference to the drawing, in which:

Figure 1. is a vertical section of the device shown applied to a hill of plants. Fig. 2. is a side view of the device with the cage removed, the view being taken at right angles to that shown in Fig. 1, and Fig. 3. is a side view of the cage detached.

In the drawing A represents a vertical standard which at its lower end is rigidly connected to a closed housing, consisting of a conical cover, B, having an open upwardly extending nipple $b$, and a flange C at its lower edge. This housing is imperforate and opaque and is braced in its attachment to standard A by inclined braces D.

G is a cage of woven wire having an upper circular band, $i$, connected by rods $c$ to a lower circular band I. This cage has at the top a detachable cover H and at its bottom has an inwardly projecting funnel $B^2$ of woven wire terminating in an open collar $g$ which funnel $B^2$ and collar $g$ fit over the housing B and its nipple $b$, as seen in Fig. 1.

To the top of standard A is attached a fumigator consisting of a bellows E and a combustion chamber F, being of any of the usual types of devices known as bee smokers, in which the bellows E has an inwardly opening valve $v$ and the combustion chamber F is adapted to receive rags, rotted wood, or other smudge-making fuel, and between which combustion chamber and the bellows is a connecting pipe $p$. From the tapered end of the combustion chamber a pipe $f$, of rubber or other material, extends down to the basic flange C and opens into the space within the same, as seen in Fig. 1.

The standard A has on one side an offsetting handle $a$, by which it may be held and steadied while manipulating the device.

The operation of my device is as follows: If a hill of plants is infested with bugs, the device is applied to the same as shown in Fig. 1, the basic flange C being sunk into the earth around the plants, which causes them to be inclosed in a dark space by the opaque housing B, the only light which can come to the same being through the open upper nipple $b$. A smudge of rags or rotted wood being made in the smoker E, F, the operation of the bellows E causes the smoke to enter the inclosed space within the housing about the plants, and the insects, being disturbed thereby, rise to the only light spot, which is the nipple $b$ and pass into the cage G and are therein trapped. The cage G, Fig. 3, containing the insects, is now removed and is subjected to a blaze made by paper, grass, straw, or the like, and the insects are destroyed, and are afterward removed by opening the detachable cover H.

Another great advantage of my invention is, that if it is desired to spray or dust powder on the plants, the housing shown in Fig. 2, may be applied to the plants in the same way, and the outlet of any ordinary spray or powder dusting device is connected with the nipple $b$ of the housing, and the spray or powder fume is thus confined to the plants in an economical way, and without being blown away by the wind or getting on the clothes.

In pointing out some of the distinctive features of my invention, I would state that the upright standard A is an important and novel feature in combination with the rest of the apparatus in that the entire device is a small portable apparatus that is carried in the hand and successively applied to the various hills of plants, and this standard allows it to be so transported and applied without stooping so low, and also forms a connecting body frame to hold the smoker F, E, to the subjacent insect receiving chamber. It is also important that the imperforate and opaque chamber B should be absolutely dark below and with a light spot at the upper thimble $b$ to which the insects by instinct rise, and to secure this result, the flange C at the bottom must have a sharp penetrating edge that can be buried in the soil, so that no light shall come in underneath the flange, due to the irregular contour of the surface of the soil, and it is also important that the smoke pipe f should enter the flange C near the bottom and on a level with the plants so as to drive the insects upwardly.

It will be understood that my invention is specially designed for such small plants as cucumbers, cantaloups, and musk melons, which are frequently destroyed in a day by the bugs which infest them. These plants when cultivated by the acre have many thousands of hills and any apparatus to be effective must be rapidly and successively applied to each of the hills and the pests taken away quickly from each hill. For this purpose the device must be conveniently portable and must not require more than a few seconds for each hill. The construction of my device permits this to be accomplished in a simple and practical way, enabling one man to easily take care of eighteen to twenty acres of this class of plants and to catch all of the bugs on five or six acres in a half a day. Two agencies are necessary for this result, one of which is a means for trapping the insects and the other is means for stirring them up and forcing them into the trap immediately.

I claim:

1. In an insect catcher, the combination of a conical, imperforate and opaque housing having a sharp edged flange at its lower edge adapted to penetrate the earth and an opening at the apex of the cone and an upright standard connected to the base of the housing and extending above the same.

2. In an insect catcher, the combination of a conical, imperforate and opaque housing having a sharp edged flange at its lower edge adapted to penetrate the earth and an opening at the apex of the cone and an upright standard connected to the base of the housing and extending above the same and a diagonal brace connecting the standard and housing.

3. An insect catcher, comprising a conical imperforate and opaque housing having a sharp edged flange at its lower edge adapted to penetrate the earth and an opening at the apex, an upright standard connected to the base of the housing and extending above the same and a detachable cage having a conical inlet fitting over the conical housing.

4. An insect catcher, comprising a conical imperforate and opaque housing having a sharp edged flange at its lower edge adapted to penetrate the earth and an opening at the apex, an upright standard connected to the base of the housing and extending above the same and a detachable cage having a conical inlet fitting over the conical housing and a fumigator mounted on the standard above the cage and having a pipe descending to and connected to the flange of the housing and communicating with the interior of the same.

5. An insect catcher, comprising a conical housing open at the bottom and having an outlet at the top, a cage arranged above the same and having a conical inlet bottom, an upright standard connected to the housing and rising above the cage, inclined braces connecting the housing to the standard, an off setting handle for the standard and a fumigator mounted upon the top of the standard and having a pipe communicating with the housing.

6. An insect catcher, comprising a dark chamber having an open bottom and a sharp-edged flange at its lower edge adapted to penetrate the earth to exclude light from below and an opening at the top, a cage covering said opening, and a blast device for stirring up the insects and forcing them immediately into the cage.

In testimony whereof I affix my signature in presence of two witnesses.

VIRDEN LINES.

Witnesses:
BERT ROBY,
CHAS. E. BRADLEY.

---

Copies of this patent may be obtained for five cents each, by addressing the "Commissioner of Patents, Washington, D. C."